United States Patent [19]

Satoh

[11] 4,323,305
[45] Apr. 6, 1982

[54] DEVICE FOR INSERTING DATA INTO PHOTOGRAPHS

[75] Inventor: Toshihiko Satoh, Kawasaki, Japan

[73] Assignee: Canon Kabushiki Kaisha, Tokyo, Japan

[21] Appl. No.: 173,691

[22] Filed: Jul. 30, 1980

[30] Foreign Application Priority Data

Jul. 30, 1979 [JP] Japan .................................. 54-97765

[51] Int. Cl.³ ...................... G03B 17/24; G03B 17/20
[52] U.S. Cl. ...................................... 354/106; 354/53
[58] Field of Search ............... 354/105, 106, 127, 128, 354/53

[56] References Cited

U.S. PATENT DOCUMENTS

| | | | |
|---|---|---|---|
| 3,889,281 | 6/1975 | Taguchi et al. | 354/105 X |
| 4,025,931 | 5/1977 | Taguchi et al. | 354/106 X |
| 4,112,444 | 9/1978 | Yonemoto et al. | 354/106 |
| 4,181,416 | 1/1980 | Ohtaki et al. | 354/106 |
| 4,199,242 | 4/1980 | Hosomizu et al. | 354/105 X |

Primary Examiner—Donald A. Griffin
Attorney, Agent, or Firm—Toren, McGeady & Stanger

[57] ABSTRACT

In a data inserting device of the type using a flash discharge tube as light source, a display means is arranged to be driven for a sufficiently long period of time in response to flashing by the discharge tube for facilitating confirmation of insertion of data effected by flashing of the discharge tube.

3 Claims, 1 Drawing Figure

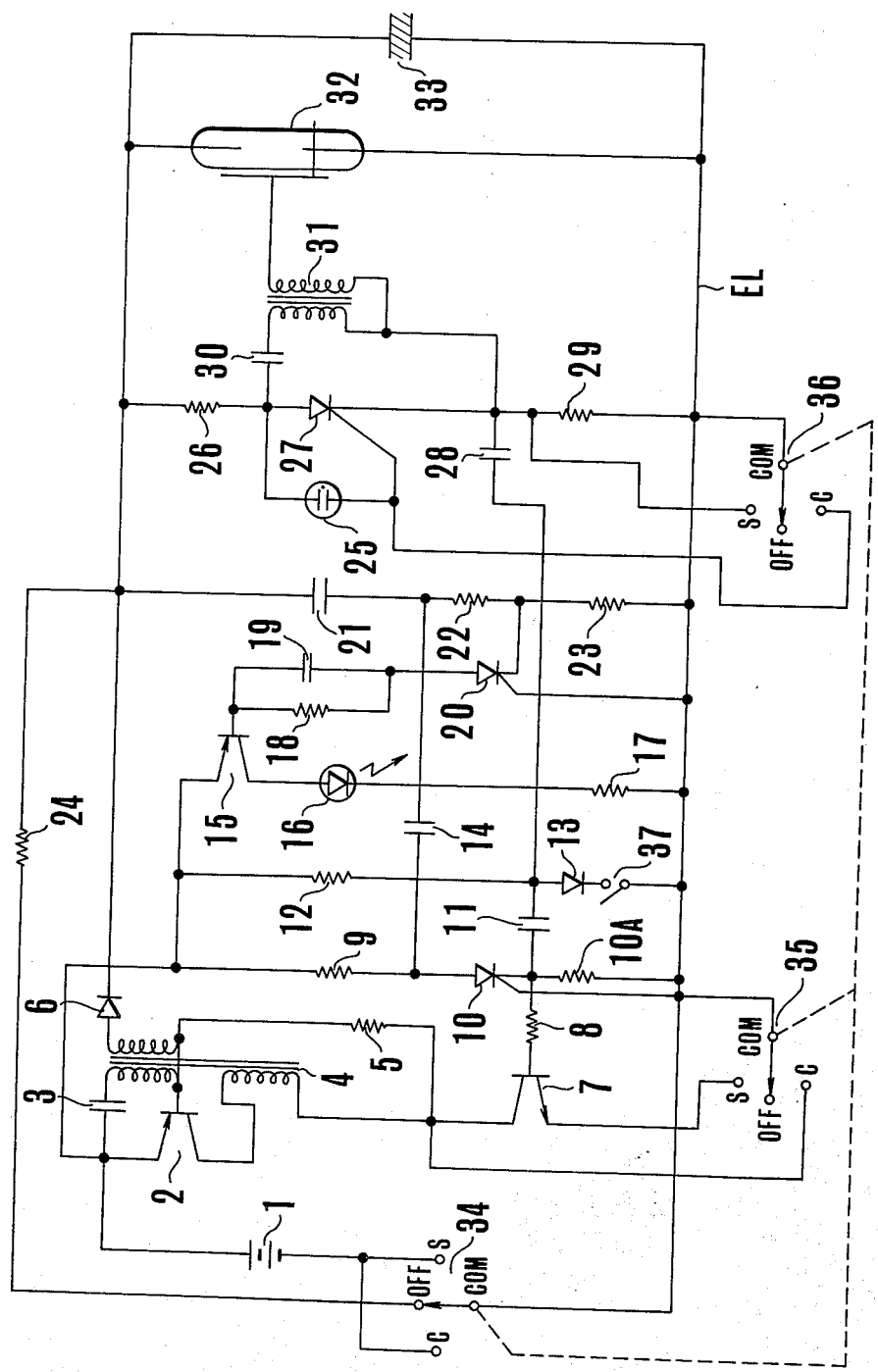

DEVICE FOR INSERTING DATA INTO PHOTOGRAPHS

BACKGROUND OF THE INVENTION

1. Field of the Invention

This invention relates to a device for inserting data into a photograph and, more particularly, to a data inserting device of the type using a flash discharge tube as light source for the data inserting operation thereof.

2. Description of the Prior Art

Of the devices for recording data such as a photographing date and the like on the surface of film together with an image, a type using a flash discharge tube as light source for the data inserting operation has been disclosed, for example, by a U.S. Pat. No. 4,181,416. In a device of this type in general, completion of a data inserting operation has been displayed by putting out a display light such as a neon tube or the like connected in parallel with a main capacitor which is arranged to accumulate flashing energy. However, since a very small quantity of light is required for the data inserting operation of the data inserting device, the main capacitor is normally of a very small capacity. In the conventional device, therefore, the recycle time thereof is so short that the above stated display light which displays completion of data insertion is put out only for a very short period of time. Therefore, it has been not easy to confirm completion of the data inserting operation.

SUMMARY OF THE INVENTION

It is therefore a general object of the invention to provide a data inserting device which solves the above stated problem of the conventional device by allowing the photographer to confirm completion of a data inserting operation without difficulty. To attain this object, in accordance with the invention, there is provided a driving means which is arranged to drive a display means for a given period of time in response to completion of data insertion.

The above and further objects, features and advantages of the invention will become apparent from the following detailed description of an embodiment thereof taken in connection with the accompanying drawing.

BRIEF DESCRIPTION OF THE DRAWING:

The sheet of drawing represents a circuit diagram showing a data inserting device to which the present invention is applied as an embodiment thereof.

DETAILED DESCRIPTION OF PREFERRED EMBODIMENT

In the drawing, which shows a data inserting device having the present invention applied thereto, there are provided a power source battery 1; a pnp transistor 2; a capacitor 3; an oscillation transformer 4; a resistor 5; and a diode 6. These elements 2–6 constitute a known boosting DC-to-Dc converter. There are also provided an npn transistor 7 which has the collector thereof connected to the primary winding of the transformer 4; resistors 8, 9 and 12; a thyristor 10 which is provided for the purpose of controlling the operation of the above stated transistor 7 with the cathode thereof connected to a ground line EL through a resistor 10A; a capacitor 11 which is connected to a diode 13 and also to the ground line EL through a data insertion starting switch 37; a capacitor 14; a pnp transistor 15 which forms a switching element, is connected to the power supply route for a light emitting diode 16 arranged to display completion of data insertion; a resistor 17 for restricting a current flowing to the above stated light emitting diode 16; a capacitor 19 which forms a timing circuit jointly with a resistor 23 and a thyristor 20, the capacitor 19 being provided with a resistor 18, which is connected in parallel with the capacitor 19 for the purpose of discharging an electric charge accumulated at the capacitor 19; and another capacitor 21 which forms a series circuit together with resistors 22 and 23. This series circuit is connected in parallel with a flash discharge tube 32 which serves as source of a light required for photographic insertion of data in a photograph to be taken on the surface of film which is not shown. A main capacitor 33 is connected to the discharge tube 32 in parallel therewith. The device further includes a resistor 24; a trigger capacitor 30; a trigger transformer 31; resistors 26 and 29 which form a charge route for the above stated trigger capacitor 30; a capacitor 28 which is arranged to supply a trigger pulse to the gate of a trigger circuit forming thyristor 27; and change-over switches 34, 35 and 36 which are interlocked with each other, each of the switches 34, 35 and 36 being provided with a movable contact COM and fixed contacts C, S and OFF.

With the data inserting device which is arranged as described in the foregoing used for a camera, it operates in the following manner.

First, in cases where the data inserting operation is to be intermittently carried out one by one and not continuously, the movable contacts of the switches 34, 35 and 36 are respectively connected to the fixed contacts S of them. This causes the capacitor 11 to be charged up to a predetermined voltage through a series circuit formed by the resistor 12, the capacitor 11, the resistor 10A and the change-over switch 34. Meanwhile, another capacitor 14 is also charged up to a predetermined voltage through a circuit formed by the resistor 9, the capacitor 14, the resistors 22 and 23 and the change-over switch 34.

When the switch 37 is closed by a data insertion start signal from the camera, the electric charge accumulated at the capacitor 11 is discharged through the diode 13, the switch 37, the gate of the thyristor 10 and the cathode of the thyristor 10. A trigger pulse is impressed on the gate of the thyristor 10, which is thereby rendered conductive from its non-conductive state. Then, this causes the electric charge accumulated at the capacitor 14 to be discharged through the thyristor 10, the resistor 10A, the resistor 23 and another resistor 22. The resistor 10A then has a control voltage produced at both ends thereof to render the transistor 7 conductive. The above stated DC-to-DC converter begins to oscillate to have a high voltage produced at the output terminal thereof. With the high voltage produced in this manner, the main capacitor 33 and the trigger capacitor 30 begin to be charged. When the terminal voltage of the main capacitor 33 reaches a predetermined voltage value, the neon tube 25 which is provided for the purpose of detecting the charge voltage is rendered conductive by this to allow a trigger current to flow through the gate and cathode of the thyristor 27. This flow of the trigger current causes the trigger capacitor 30 to discharge the electric charge thereof through the thyristor 27 and the trigger transformer 31. This discharge causes the discharge tube 32 to flash a light in a known manner and data insertion is effected on the surface of film which is not shown.

When the discharge tube 32 is triggered to begin flashing, the electric charge accumulated at the capacitor 21 is also discharged through the discharge tube 32, the gate and cathode of the thyristor 20 and the resistor 22. This discharge from the capacitor 21 causes a reverse bias voltage to be impressed between the anode and cathode which are main electrodes of the above stated thyristor 10 to change the thyristor 10 from its conductive state back to its non-conductive state. The transistor 7 then also changes from its conductive state to its non-conductive state to cause the above stated DC-to-DC converter to stop oscillating.

Meanwhile, a trigger pulse is impressed on the gate of the above stated thyrister 20 to make the thyristor conductive. Then, a base current flows to the base of the transistor 15 through the capacitor 19, the thyristor 20 and the resistor 23. This causes the timing circuit to begin a timing action and, at the same time, the transistor 15 also becomes conductive. Therefore, a driving current is supplied to the light emitting diode 16 through the transistor 15 and the light emitting diode then informs the photographer of completion of a data inserting operation.

The base current which flows to the base of the transistor 15 not only renders the transistor 15 conductive but also charges the capacitor 19 of the timing circuit. Therefore, the base current gradually decreases according to the resistance value of the resistor 23 and the capacity of the capacitor 19 and thus eventually becomes lower than the holding current of the thyristor 20. When the base current becomes lower than the holding current of the thyristor 20, the thyristor 20 is immediately changed into a non-conductive state. This in turn changes the transistor 15 into a non-conductive state. Then, the above stated light emitting diode 16 comes to put out its light after displaying the completion of data insertion for a given period of time which is sufficiently long to enable the photographer to notice the display of completion of the data inserting operation.

Following this, when a next data insertion start signal is produced, the processes described in the foregoing are repeated.

While the one-by-one intermittent data inserting operation of the device is as described in the foregoing, a continuous high-speed data inserting operation of the device on the surface of film when the camera is to be driven by a motor drive device or the like is carried out in the following manner:

In such a case, the movable contacts of the above stated change-over switches 34, 35 and 36 are connected to their fixed contacts C respectively. With the movable contact COM of the change-over switch 35 thus connected to the fixed contact C thereof, unlike the above stated intermittent operation, one terminal of the transformer 4 is directly connected to the ground line EL and not through the transistor 7. Therefore, the above stated DC-to-DC converter immediately begins to oscillate to have the capacitor 21, the trigger capacitor 30 and the main capacitor 33 charged with the output current of the DC-to-DC converter. Following this, when the data insertion start switch 37 is closed, the electric charge of the capacitor 28 is discharged through the diode 13, the normally open type switch 37, the change-over switch 36 and the gate and cathode of the thyristor 27. By this, a trigger pulse is applied to the gate of the thyristor 27 to make the thyristor 27 conductive. This causes the trigger capacitor 30 to discharge its electric charge through the thyristor 27 and the trigger transformer 31. Then, the discharge tube 32 comes to emit a light in a known manner to effect data insertion on the surface of the film.

In the meantime, the electric charge of the capacitor 21 is discharged through the discharge tube 32 in the same manner as in the intermittent data inserting operation. This discharge triggers the thyristor 20 to make it conductive and thus to cause the timing circuit to begin its timing action. Then, concurrently with this, the light emitting diode 16 lights up and remains alight for a predetermined period of time to inform the photographer of completion of data insertion. Unlike the intermittent data inserting operation, however, the DC-to-DC converter works immediately after the flashing action of the flash discharge tube to quickly bring each circuit component back into its initial state, because the transistor 7 in this case is not connected to the power supply route of the DC-to-DC converter. Then, the processes described in the foregoing are repeated in response to a next data insertion start signal.

The arrangement of the invention being such, the device enables the photographer to confirm completion of the flashing action of the flash discharge tube without fail. Besides, under a single frame photographing mode in which the movable contact of each change-over switch is connected to the fixed contact S for an intermittent data inserting operation, the transistor which is connected to the power supply route for the DC-to-DC converter automatically becomes non-conductive, so that the power of the power source battery can be prevented from being wasted.

Further, while the power supply transistor is conductive, the potential difference between the collector and emitter thereof is very small, so that the power can be efficiently transferred to the secondary side of the DC-to-DC converter to minimize an adverse effect on the recycle time of the device.

What is claimed is:

1. A data inserting device having a flash discharge tube employed as a light source required for data insertion, said data inserting device comprising:
   a capacitor for supplying said flash discharge tube with an electric energy, said capacitor having a particular recycle time;
   display means for displaying completion of data insertion; and
   driving means for driving said display means for a predetermined period of time in response to a flashing action of said flash discharge tube, said predetermined period of time being longer than the recycle time of the capacitor.

2. A data inserting device according to claim 1, wherein said driving means includes a timing circuit which commences a timing action in response to the flashing action of said discharge tube and switching means which closes the power supply route for said display means in response to the commencement of the timing action of said timing circuit.

3. A data inserting device according to claim 2, wherein said driving means further includes signal producing means which is connected in parallel with said discharge tube and is arranged to produce an electrical signal for triggering said timing circuit in response to flashing by said discharge tube.

* * * * *